United States Patent Office 3,540,295
Patented Nov. 17, 1970

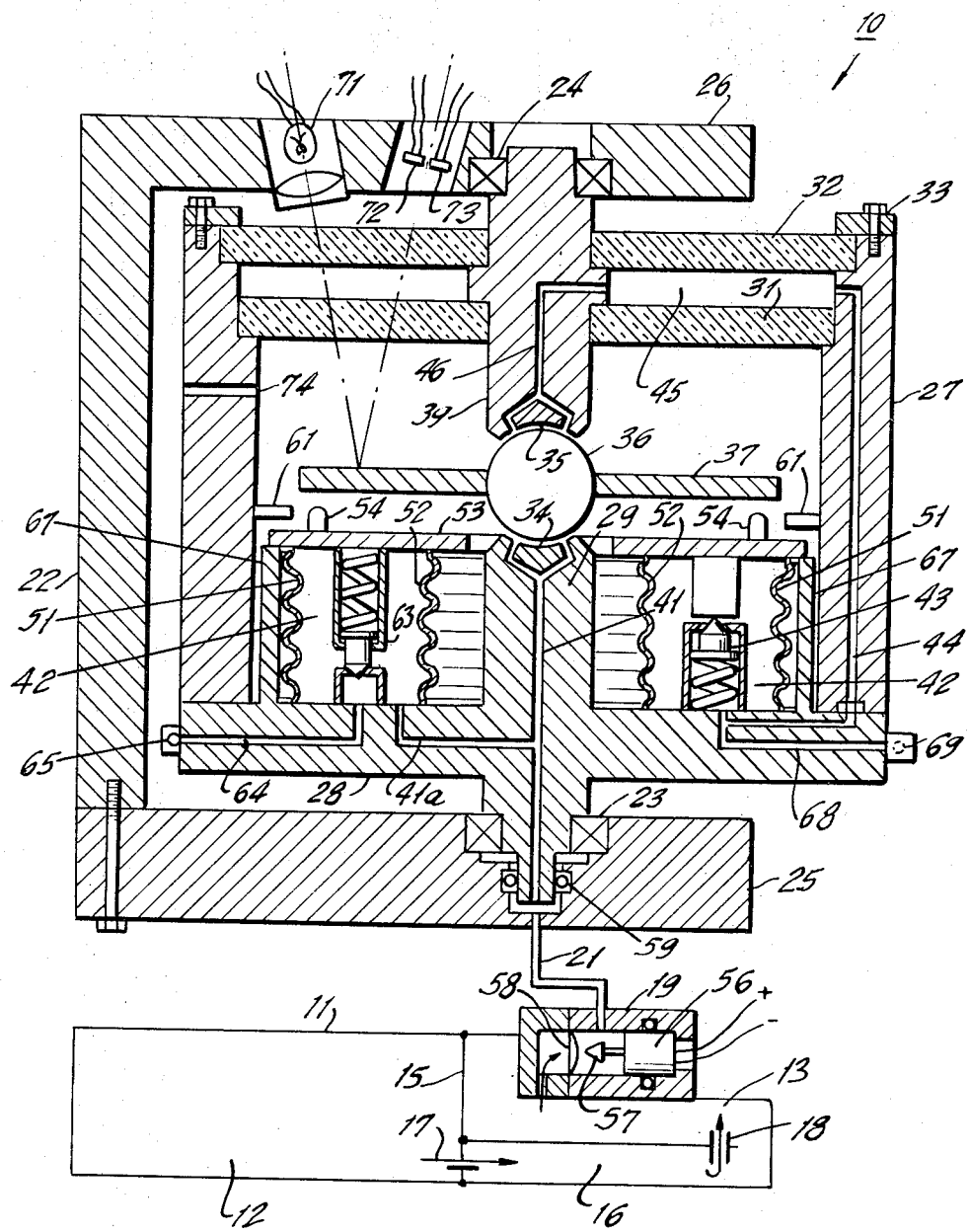

3,540,295
ROTATING CASE GYROSCOPE
Nai-Chong Chang, Scarsdale, James A. Xenakis, Woodside, and Melvin Levine, New York, N.Y., assignors to Sperry Rand Corporation, Ford Instrument Division, Long Island City, N.Y., a corporation of Delaware
Filed May 29, 1968, Ser. No. 733,112
Int. Cl. G01c 19/26
U.S. Cl. 74—5.12                                   10 Claims

ABSTRACT OF THE DISCLOSURE

A spherical gas bearing means for a gyro wheel is mounted to a case which in turn is rotatably mounted on a frame by fixed mechanical bearings. A caging means mechanically connects the gyro wheel to the case during a spin-up interval when pressurized fluid directed through nozzles on the case bring the case and gyro wheel as a unit up to operating speed. Valve means operated in conjunction with the caging means controls fluid flow to spin-up nozzles and rotation sustaining nozzles, and also controls gas flow to one of the spherical bearing pads so that pressure at the latter will not interfere with the caging means when it is activated to connect the gyro wheel to the case. Fluid is connected to this spherical bearing pad through a passage between two transparent discs through which the light beam of an optical pick off device passes in impinging upon and being reflected from the gyro wheel in order to obtain guidance information.

THE INSTANT INVENTION

This invention relates to miniature gyroscopes in general and, more particularly, relates to a gyroscope in which the gyro wheel is brought to operating speed while it is caged to a rotatable case.

As will hereinafter be seen, the gyroscope of the instant invention is particularly adaptable for high G applications such as guidance of rockets and small rocket boosted mortar and artillary projectiles. As will also be seen, the gyro of the instant invention, is operational for minutes or hours rather than merely for seconds as is usual with this class of gyro, has low drift (due to drift compensation through case rotation), and is therefore applicable to missile guidance or safing, arming and fusing systems.

Early embodiments of coast-down gyros were usually single ball bearing spin axis designs. Where a two axis stabilization was required, spherical gas bearing designs were often used with the ball portion of the gas bearing being either on the stationary element or part of the gyro wheel. Caging and spin-up were usually accomplished by compressed gas with the gyro wheel coasting during an operational period after uncaging. Pressurized gas was continuously supplied to the spherical bearing but no energy was supplied to the wheel to sustain angular momentum after uncaging since to do so would have introduced large gyroscopic errors. Thus, the operating time and drift performance for gyros of the prior art was limited.

In the device of the instant invention the gyro wheel is brought to operational speed while it is caged to rotate in unison with its case. The case, in turn, is rotationally mounted to the vehicle frame on fixed mechanical bearings. This results in reduced caging errors since the caging mechanism does not have to provide clearance for the gyro wheel during spin-up to operational speed.

Operational speed for the gyro wheel is sustained over an extended period of time since case rotational speed is maintained by small case mounted sustaining jets, with the gyro wheel, the case and air in the case rotating at approximately the same speed. Thus, there is an absence of drag so the gyro wheel maintains its high angular momentum for a long operating time with this momentum being substantially constant to improve accuracy. Accuracy is further improved in that case rotation eliminates large case fixed torques.

In the prior art constructions utilizing spherical gas bearings, when the gyro wheel rotating at high speed touched the stationary bearing pad, much more often than not, bearing failure occurred as a result of seizure and scoring. In the device of the instant invention, since the gyro wheel and case are rotating at essentially the same speed, bearing failure will not occur even if the gas bearing bottoms momentarily.

The foregoing is particularly important for certain flight profiles and requirements if guidance is not required in the exceptionally high G phase. As an example, consider a rocket assisted artillery projectile. Such projectile is propelled from the artillery piece by an explosive charge, the projectile is subjected to thousands of G's for approximately 20 milliseconds. When the projectile leaves the artillery tube a range increasing rocket motor is ignited and at this time the projectile is subjected to 10 to 20 G's lasting from 10 to 30 seconds.

Ideally, a guidance mechanism should become operational as soon as the projectile leaves the mortar tube. That is, even though the tube has restricted projectile angular motion, guidance must be provided within several milliseconds after the projectile leaves the tube or significant angular motion may occur without being detected.

Since 60 to 160 milliseconds is required to spin up a gyro wheel the wheel must be spun up just before firing, and in prior art constructions the wheel must be spinning during the period after firing when the projectile is still in the artillery tube and it is being subjected to extremely high G forces. In prior art constructions the rotating gyro wheel was prevented from touching the stationary bearing pad during this high G phase by applying very high pressure to the bearing pads during this period. But after this phase ended, gas pressure at the bearings had to be reduced for the relatively long duration of the relatively low G flight phase in order to improve gyro drift characteristics.

Another prior art approach utilized a so-called inside out type of gas bearing where the ball is the stationary member. This type of construction provides a relatively high area to weight ratio thereby permitting more moderate gas pressure to be used in both the high G and low G flight phases. However, this approach is merely a compromise since gas pressure at the bearings must be high enough for the high G phase, and when made high enough for this phase is unnecessarily high for the low G phase thereby compromising gyro drift performance.

Accordingly, a primary object of the instant invention is to provide a novel construction for a miniature gyro.

Another object provides a gyro unit in which the wheel is spun up by being caged to a rotating case.

A further object is to provide a gyro construction in which the caging mechanism operates valving for controlling gas flow to various portions of the gyro mechanism.

A further object is to provide a gyro construction in which a conduit directing gas to a gas bearing is formed of spaced transparent plates through which the light beam of an optical pick off passes before impinging upon the gyro wheel.

These as well as other objects of this invention will become readily apparent after reading the following description of the drawing in which the single figure is a cross-section in schematic form showing a gyroscopic device constructed in accordance with the teachings of the instant invention.

Now referring to the figure. Gyroscope 10 includes supply tank 11 wherein pressurized gas, such as air, is stored. Tank 11 is divided into compartments 12 and 13, by means of partition 15 and pressure regulator 16 which has inlet 17 and outlet 18. Compartment 13 stores enough fluid for caging and initial spin-up while compartment 12 stores fluid for sustaining the spin and lubricating the rotor bearing during the life of the gyro.

Puncturable sealing device 19 is interposed between compartment 13 and tube 21 which extends to the bottom leg of C-shaped frame 22 adapted to be strapped down to the projectile being guided. Ball bearings 23, 24 in frame arms 25, 26, respectively, rotatively support cylindrical case 27. In particular, the lower end of case 27 is closed by disk-like cover 28 having a downward bearing projection supported by bearing 23. Upwardly extending post 39 at the upper end of case 27 is closed by spaced-parallel disks 31, 32 retained by ring 33. For a reason to be hereinafter explained, disks 31 and 32 are transparent. The upper end of post 39 extending through disks 31, 32 is rotatively supported by bearing 24.

Posts 29 and 39 are in axial alignment along the cylindrical axis of case 27. The upper end of lower post 29 is spherical and provides lower gas bearing pad 34 while the lower end of upper post 39 is also spherical and forms gas bearing pad 35. Ball 36 located at the center of gyro disk 37 is disposed between bearing pads 34, 35. The relative shapes of bearing pad 34, 35 and ball 36, as well as the spacing between pads 34, 35 is a matter well known to those skilled in the art of spherical gas bearings. Gas for lower bearing pad 34 is provided from tube 21 through axial passage 41 in post 29. Pressurized gas for upper bearing pad 35 is provided from tube 21 through the lower portion of passage 41 and its extension 41a to a ring-like bellows chamber 42, valve 43, case passage 44, the space 45 between disks 31, 32, and passage 46 in upper post 39.

Chamber 42 is formed of spaced cylindrical bellows 51, 52 with the former surrounding the latter. Both bellows 51 and 52 are positioned about lower post 29 and concentric therewith. The lower ends of bellows 51, 52 are secured to lower case cover 28 while the upper ends of diaphragms 51, 52 are secured to the underside of caging disk 53 having upwardly extending caging tips 54, 54, etc. engageable with the lower surface of gyro wheel 37.

Operation of gyroscope 10 is initiated by the application of an electrical signal to actuator squib 56 of sealing device 19 causing an explosion which propels dart 57 through sealing diaphragm 58 permitting gas to flow from compartment 13 and tank 11 through the rotary gas coupling between case 27 and frame 22 sealed by O-ring 59. In the initial interval, or spin-up period, high pressure gas from tank 13 is used. During this period gas flow from tank 12 in tank 13 is inhibited by the setting on pressure regulator 16. Only after pressure in tank 13 falls below the pressure setting of regulator 16 will gas flow from tank 12 into tank 13, through regulator inlet 17 and outlet 18.

Thus, during spin-up high pressure gas from compartment 13 flows into the chamber 42 bounded by the lower cover 28 of case 27, bellows 51, 52, and caging plate 53. As soon as this high pressure gas enters chamber 42 such gas exerts an upward force that overcomes the downward biasing forces exerted by bellows 51, 52 forcing caging tips 54 upwardly into engagement with gyro wheel 37. This upward motion is limited by stops 61.

Immediately prior to caging, valve 63 opens permitting high pressure gas flow through gas passage 64 to tangential spin-up jet forming nozzles 65, only one of which is shown. At this same time valve 43 closes, shutting off the gas supply to upper bearing pad 35 and nozzle 69.

Gas under pressure is constantly supplied to lower bearing pad 34 after diaphragm 58 is punctured. Force transmitted through caging tips 54 and the initial high pressure gas in lower bearing 34 force ball 36 upward against the now unlubricated upper bearing pad 35 with the frictional contact therebetween making gyro wheel 37 and case 27 move as a unit.

The reaction forces of pressurized gas flowing from spin-up nozzles 65 rotate case 27 and gyro wheel 37 as a unit to an operational speed until pressure in chamber 13 drops to slightly above the pressure settings of regulator 16. At this point the tension forces exerted downward by bellows 51, 52 retract caging plate 53 to a position resting against stops 67. Actual release of gyro wheel 37 occurs gently as valve 43 opens permitting gas flow to lubricate upper bearing pad 35 and permitting pressurized gas to flow through passage 68 to tangential sustainer jet nozzles 69, only one of which is shown. Reaction forces of pressurized gas flowing from nozzles 69 maintains case spin rate at an operational level. Valve 63 closes shutting off the gas supply to spin-up nozzles 65.

At this time gyroscope 10 is operational utilizing gas from chamber 12.

As optical pick off device, including light source 71 and photo diodes 72, 73 all mounted to the upper leg 26 of frame 22, is set to produce a null output when gyro wheel is caged. Although only one pick off is illustrated, there is a second pick off located 90° from the one shown in the figure. As is well known to the art, such a two pickoff arrangement provides electrical control signals proportional to the angle between the H vector and the longitudinal gyro axis. The upper surface of gyro wheel 37 is polished to reflect light impinging upon it from lamp 71. The utilization of separated glass plates or disks 31, 32 permits passage of fluid to upper bearing pad 35 without interfering with the optical pick offs. Spent bearing fluid escapes from case 27 through vent 74.

Thus, it is seen that in gyroscope 10 the rotor and case are spun up as one unit and maintained at constant angular velocity by sustaining jets with an unlubricated bearing pad and/or the caging mechanism transmitting the required torque from case to rotor. The rotor is then uncaged and floated on relatively low pressure fluid. When the projectile propelling explosive is fired the gyro ball will touch and be supported by the lower bearing pad but no damage will be done to either since there is no relative angular motion between the gyro wheel and case. The high G forces acting on the mass balanced gyro wheel will keep it forced against the lower bearing pad where pad-ball friction will prevent relative angular motion. The caging established orientation between gyro wheel and case, and the speed of the gyro wheel will be maintained during the high G phase in the projectile firing tube. As the projectile exits from the tube the G forces drop to moderate values and low pressure fluid floats the gyro wheel. This happens almost instantaneously, and well before disturbing forces can cause angular motion of the projectile its guidance system is operational.

Another approach to achieving very high G capability with a rotating case gyroscope construction is to use a triggering pin at the end of the missle firing tube to uncage the gyro wheel. With such a construction the gyro wheel is caged and spun up together with the case, but caging is not released until the projectile is just leaving its firing tube. The caging mechanism supports the gyro wheel during the high G flight phase and no bearing pad damage or gyro wheel slow-down can occur since case and gyro wheel are rotating at the same angular velocity.

If operation of the gyroscope is not required during the high G phase of flight, uncaging may be delayed by a pneumatic timer. The cage gyro wheel will be capable of resisting very high G forces. Also in high G applications where guidance is not required during the initial high G phase it is possible to permit the gyro wheel to bottom.

As noted before, this will not damage the bearing pads or slow down the gyro wheel since the wheel and pad are spinning at the same speed.

It is noted that fastening devices for positively maintaining certain elements in the positions shown in the figure have not been illustrated. Since such fastening device and/or retainers are well known to the art, it appears preferable not to clutter the figure with details that are not necessary for a complete understanding of this invention.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A gyroscopic device including a frame; a case; first bearing means supporting said case on said frame for rotation about a first axis; a gyro wheel; second bearing means supporting said wheel in said case for rotation about a spin axis extending through and generally in the direction of said first axis; caging means which when active connects said wheel to said case for rotation in unison therewith; means for rotating said case and said wheel as a unit to an operational speed; first means for deactivating said caging means after said case and said wheel are rotating at said operations speed to release said wheel from said case whereby said spin axis is free to pivot relative to said first axis; and pickoff means to detect changes in position of said spin axis relative to said frame and generate control signals related to said changes.

2. A gyroscopic device as set forth in claim 1 in which said second bearing means comprises a spherical gas bearing means.

3. A gyroscopic device as set forth in claim 2 in which said first bearing means comprises spaced mechanical shaft bearings.

4. A gyroscopic device as set forth in claim 2 in which said gas bearing means comprises an upper and a lower bearing pad mounted in spaced relationship with said rotor positioned therebetween; first valve means for controlling gas flow to said upper pad; means for operating said first valve means to cutoff gas flow to said upper pad when said caging means is active.

5. A gyroscopic device as set forth in claim 4 in which said pickoff means is an optical unit including a light source on said frame directing a light beam toward said gyro wheel; said case being cylindrical and having its said cylindrical axis coinciding with said first axis; passage means for directing gas to said upper pad of said gas bearing means; said passage means including a section comprising a pair of spaced transparent disks at one end of said case; said light beam projecting through said transparent disks before impinging upon said gyro wheel.

6. A gyroscopic device as set forth in claim 4 also including a spin-up jet means for directing gas flow to bring said unit up to operational speed and additional jet means for directing gas flow to sustain rotation of said case after it has reached operational speed; second valve means for controlling gas flow to said spin-up jet means; means for operating said second valve means to cut off gas flow to said spin-up jet means when said caging means is inactive.

7. A gyroscopic device as set forth in claim 6 in which both said spin-up and said additional jet means comprise nozzles mounted on said case.

8. A gyroscopic device as set forth in claim 6 in which said first valve means is operated to direct gas flow to said additional jet means when said caging means is inactive.

9. A gyroscopic device as set forth in claim 8 further including an expandable bellows connected to said caging means for activating of the latter when pressure of gas in said bellows exceeds a predetermined level.

10. A gyroscopic device as set forth in claim 9 in which said first and said second valve means are connected to said bellows for operation of each of said valve means in accordance with gas pressure within said bellows; said first valve means being operated open and said second valve means being operated closed by said bellows when pressure of gas therein is below said predetermined level.

References Cited

UNITED STATES PATENTS

| | | | |
|---|---|---|---|
| 2,441,307 | 5/1948 | Alkan | 74—5.1 |
| 2,524,553 | 10/1950 | Wendt | 74—5.1 |
| 2,729,106 | 1/1956 | Mathieson | 74—5.7 |
| 2,990,719 | 7/1961 | Souder | 74—5.1 |
| 3,115,784 | 12/1963 | Parker | 74—5.12 |
| 3,270,568 | 9/1966 | Morarek et al. | 74—5.12 |

MANUEL A. ANTONAKAS, Primary Examiner

U.S. Cl. X.R.

74—57